United States Patent [19]
Hujik

[11] 3,914,086

[45] Oct. 21, 1975

[54] EJECTOR DEVICE FOR INJECTION MOLDING APPARATUS

[75] Inventor: Ladislav Hujik, Batawa, Canada

[73] Assignee: Bata Shoe Company, Inc., Belcamp, Md.

[22] Filed: Oct. 29, 1974

[21] Appl. No.: 519,017

[30] Foreign Application Priority Data
Oct. 29, 1973 Canada .................. 184460

[52] U.S. Cl. .............. 425/437; 425/444; 249/66 C; 249/68; 425/129 S; 425/249; 425/252
[51] Int. Cl.² .... B29F 1/14; B29C 7/00; B29H 7/08
[58] Field of Search .... 425/119, 129 S, 130, 242 R, 425/249, 436, 437, 438, 444, 247, 124, 125, 127, 252; 418/345, 42 H, 42 D; 249/66 C, 66 RP, 67, 68, 105, 107

[56] References Cited
UNITED STATES PATENTS

| | | | |
|---|---|---|---|
| 2,773,284 | 12/1956 | Kelly | 249/66 C X |
| 2,783,501 | 3/1957 | Kutik | 249/68 X |
| 3,028,629 | 4/1962 | Focht et al. | 425/249 X |
| 3,142,863 | 8/1964 | Mazzoni | 425/437 X |
| 3,299,476 | 1/1967 | McIlvin | 425/129 S X |
| 3,642,417 | 2/1972 | VonHoldt | 425/444 X |
| 3,687,591 | 8/1972 | Perego | 425/444 X |
| 3,732,055 | 5/1973 | Hujik | 425/444 X |

*Primary Examiner*—J. Howard Flint, Jr.
*Attorney, Agent, or Firm*—Fleit & Jacobson

[57] ABSTRACT

An ejector device for ejecting a heel or the heel portion of a sole from the cleat of a mold bottom in an injection molding apparatus includes an ejector pin with a plurality of fingers at one end thereof, the number of fingers being equal to the number of prongs on the cleat. Each of the fingers is slidably mounted in and forms a part of one of the prongs, whereby, when air under pressure is introduced into the mold bottom beneath the ejector pin, the fingers rise out of the cleat to eject the heel from the cleat and mold bottom.

6 Claims, 15 Drawing Figures

FIG. I (PRIOR ART)

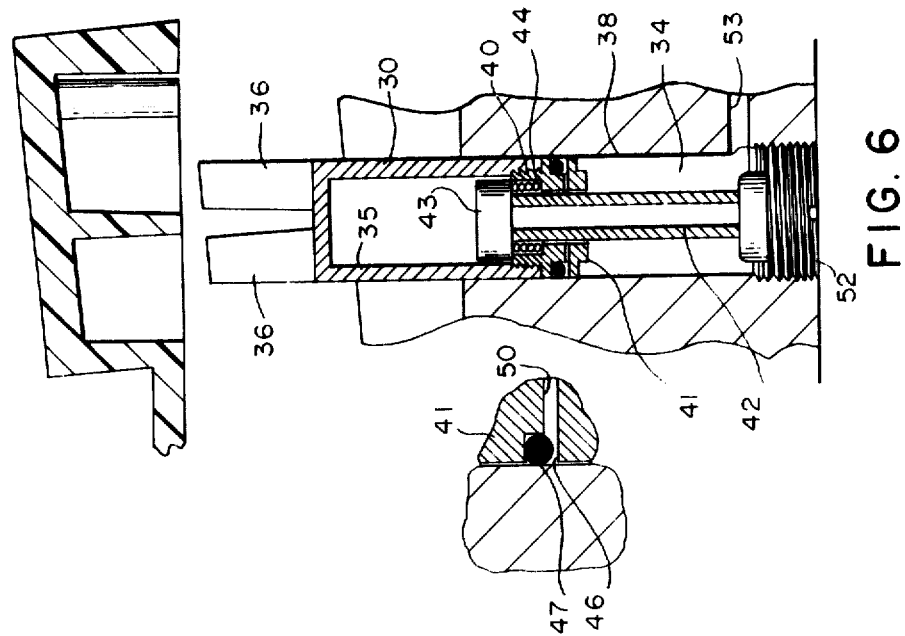
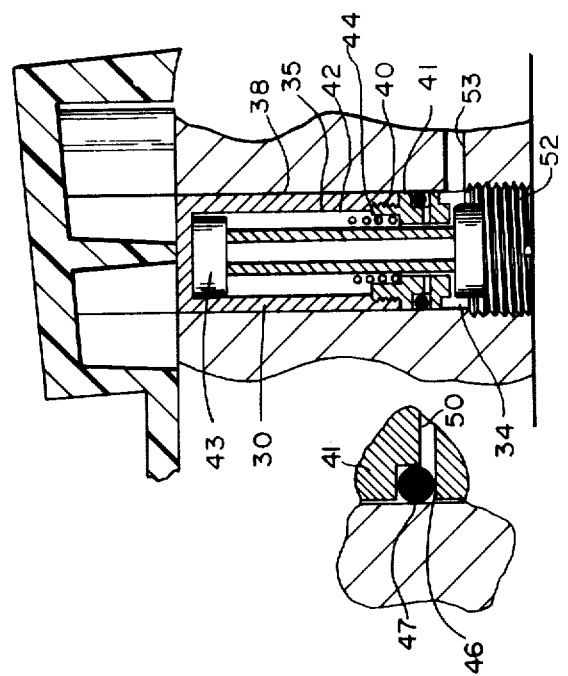
FIG. 6
FIG. 5

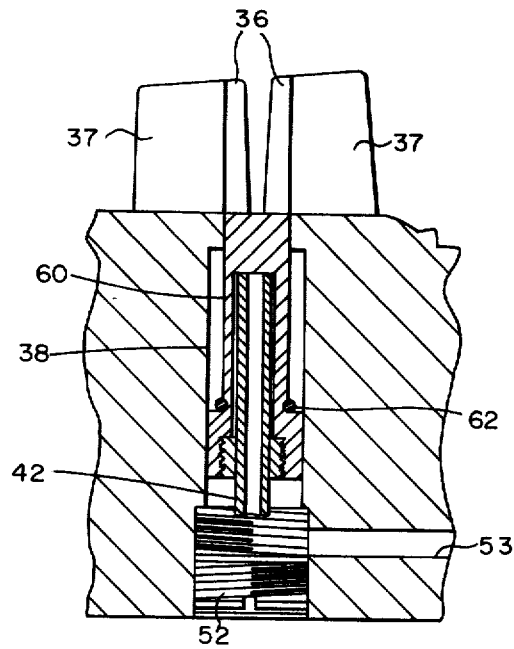
FIG. 10
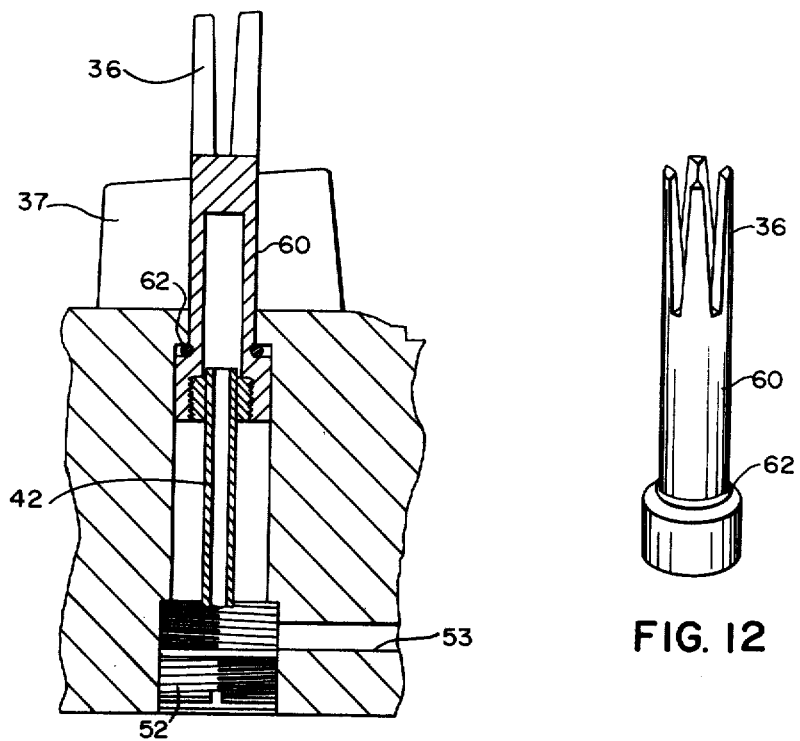
FIG. 11
FIG. 12

EJECTOR DEVICE FOR INJECTION MOLDING APPARATUS

BACKGROUND OF THE INVENTION

1. Field of the Invention

This invention relates to an ejector device for use in a mold for the injection molding of shoe soles.

2. Description of the Prior Art

Many of the presently available shoes include a thick heel. In order to reduce production costs, such heels are normally hollow, with reinforcing ribs extending between the sides and ends thereof. The soles are produced in a mold cavity formed by a top mold and a bottom mold, the latter including a heel cleat extending into a heel cavity in the mold top. The heel cleat is in the form of a base mounted on the bottom mold and includes, e.g. four prongs which project upwardly into the heel portion of the mold cavity of the top mold. The prongs forming the heel cleat may be integral with the bottom mold. The four prongs in conjunction with the heel cavity result in a hollow heel with reinforcing ribs extending between the sides and ends thereof, the ribs forming a cruciform reinforcing element when viewed from above.

It has been found that soles of the type described above are difficult to remove from the molds. At the termination of molding and curing, the top mold is raised, and the finished sole is retained on the bottom mold. The usual method of discharging the sole is to actuate pheumatically or mechanically operable ejector pins. The pins are thrust against the front and heel portions of the sole to push the sole away from the bottom mold. When the mold is closed, the top ends of the pins are flush or almost flush with the molding surface of the bottom mold. However, it has been found, particularly with soles having large heels, that the soles cannot readily be ejected. In fact, in some cases, the sole is only partly ejected and must be removed from the bottom mold manually. The heel of the sole tends to stick or hang onto the heel cleat and while the front end of the sole is ejected, the heel end remains attached to the cleat. Of course, the same problem would arise when molding thick heels only, without the instep or toe portion of the sole.

SUMMARY OF THE INVENTION

The object of the present invention is to overcome the above problem by providing a relatively simple ejector device for use in the mold of an injection molding machine which ensures complete separation of a heel from a bottom mold following an injection molding operation.

In accordance with the present invention, the above mentioned problem is overcome by an ejector device for use in an injecting molding machine, in which a sole is molded in a mold cavity defined by a top mold, a bottom mold and a heel cleat on said bottom mold extending into a heel cavity, the heel cleat including a plurality of prongs, said injector device comprising an ejector pin including a plurality of fingers equal in number to the number of prongs on said cleat, each of said fingers being slidably mounted in and forming a part of one of said prongs; and pressure means for thrusting said ejector pin against the interior of the heel to eject the heel from the bottom mold. In the foregoing, plurality is intended to mean more than two, and sole is intended to mean a complete sole, i.e. a sole including an integral heel, instep and toe portions or a heel only.

BRIEF DESCRIPTION OF THE DRAWINGS

The invention is defined hereinafter in greater detail with reference to the accompanying drawings which illustrate several embodiments of the invention, and wherein:

FIGS. 5 and 6 are longitudinal sectional views of the heel end of the bottom mold and cleat of the mold of FIG. 4 during a molding operation and during ejection of the heel;

FIGS. 10 and 11 are longitudinal sectional views of the heel end of a bottom mold incorporating yet another embodiment of the heel ejector device;

FIG. 12 is a perspective view of the ejector pin used in the apparatus of FIGS. 10 and 11.

DESCRIPTION OF THE PREFERRED EMBODIMENTS

Figure 1:
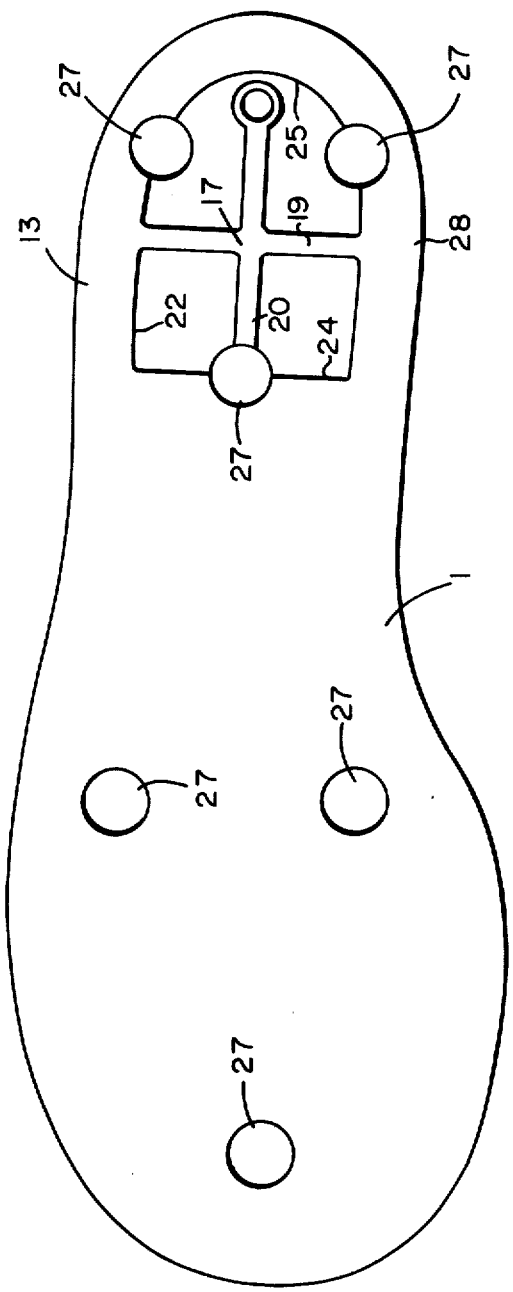
FIG. 1 is a plan view of a shoe sole produced in a mold using a presently available ejector pin assembly.
Figure 2:
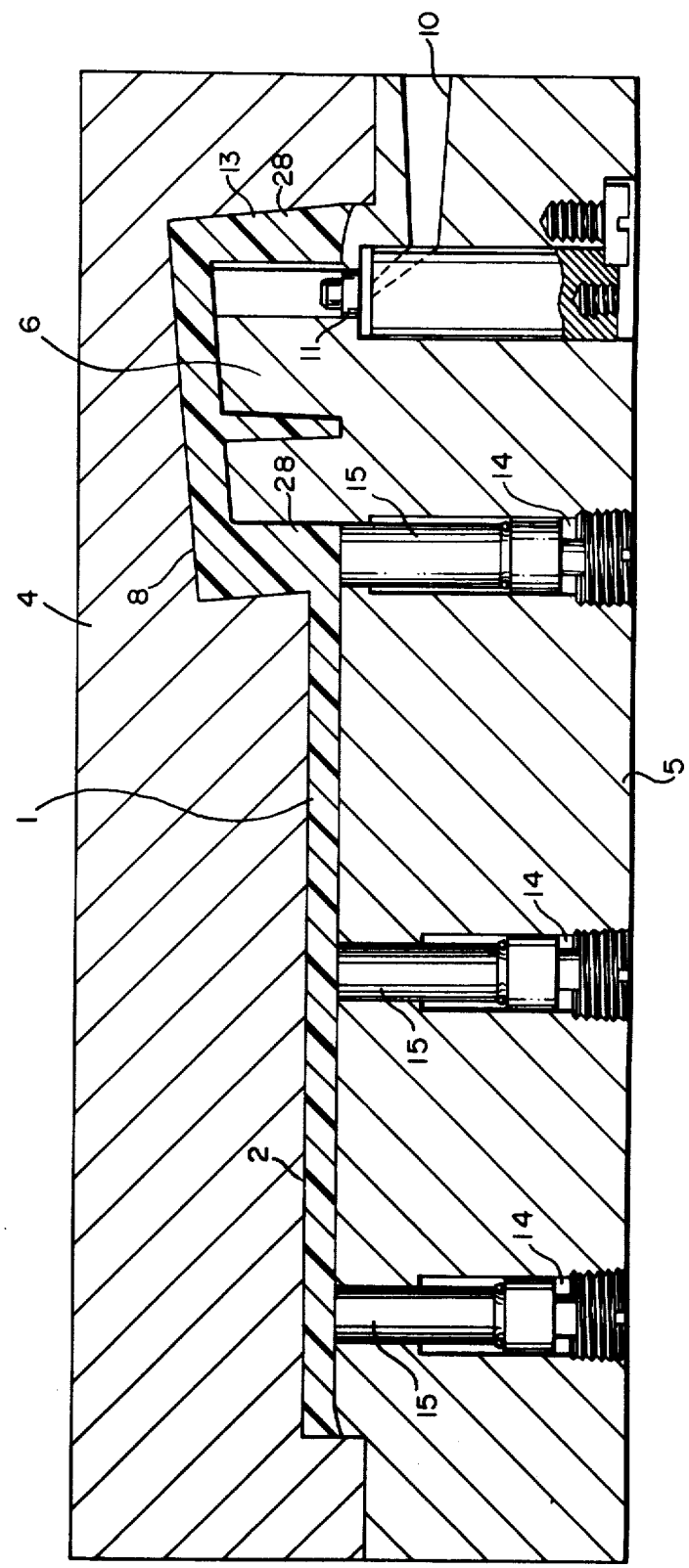
FIG. 2 is a longitudinal sectional view of a mold for molding the shoe sole of FIG. 1.
Figure 3:
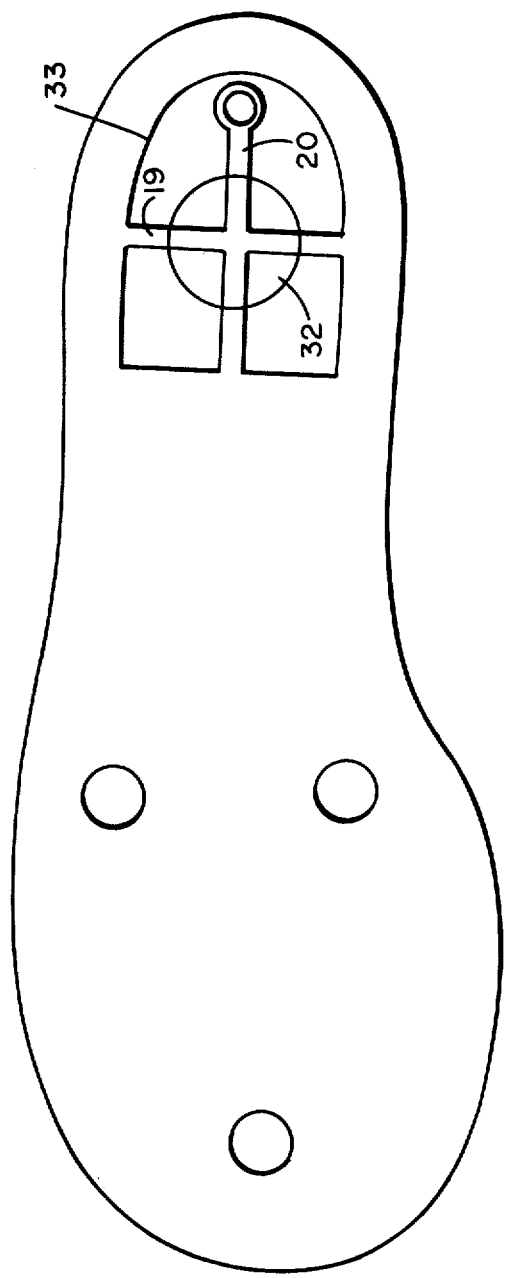
FIG. 3 is a plan view of a shoe sole produced in a mold using the ejector device of the present invention.

With reference to FIGS. 1 and 2, a shoe sole 1 is molded in a mold cavity 2 defined by a top mold 4, a bottom mold 5 and a heel cleat 6 projecting upwardly from the bottom mold 5 into a heel cavity 8 in the top mold 4. The mold is closed by bringing the top and bottom molds 4 and 5 together. A thermoplastic material is injected into the mold cavity 2 through an injection port 10 and an injection orifice (not shown) in an insert 11. The material enters the mold in the area of the cleat and fills the cavity 2. Following injection, the mold is kept closed while the sole material cures or hardens to form a finished sole 1 including a heel 13.

Upon completion of the curing step, the mold is opened by separating the top and bottom molds 4 and 5, respectively. The sole 1 is retained on the bottom mold 5 and the heel cleat 6. Then, air under pressure is introduced into chambers 14 beneath ejector pins 15 to thrust the pins against the sole 1 to release the sole from the bottom mold 5 and the cleat 6.

One possible pin arrangement is to utilize a plurality of pins 15 in the toe area of the sole 1 with a central heel ejector pin (not shown) which bears against centre 17 of reinforcing ribs 19 and 20 extending between the sides 22, and front and rear 24 and 25, respectively of the heel 13. However, such an arrangement of ejector pins is unsatisfactory, because the heel 13 and cleat 6 have large surface areas in close contact. Thus, the heel 13 would probably not be dislodged from the cleat 6.

Another arrangement of the ejector pins 15 is illustrated in FIG. 1 where the areas 27 of the sole 1 engaged by the pins are more or less uniformly distributed over the heel and toe portions of the sole 1. While such an arrangement of ejector pins is more satisfactory than that described above, it is still difficult, if not impossible, to dislodge the heel 13 from the cleat 6. Moreover, the rearmost area of pin engagement are unsatisfactory, because they are located in areas which are used for gluing the sole to an upper. Often, the pins 15 are not flush with the top surface of the bottom mold 5, and thus depressions or ridges may occur in the gluing area of the heel. During removal of the heel 13 from the cleat 6, the ejector pins compress the side wall 28 of the heel 13, pressing the side wall 28 even more tightly against the heel cleat 6. Thus, removal of the heel 15 from the cleat 6 may be exceptionally difficult if not impossible.

In accordance with the present invention, the problem of heel ejection is solved by replacing the heel ejector pins with a single relatively large ejector pin 30 (FIG. 4), which engages the heel 13 in the area 32 at the bottom of a heel cavity 33 and grips the ribs 19 and 20. Thus, removal of the shoe sole from the bottom mold is facilitated. When air under pressure is introduced into the chamber 34 beneath the ejector pin 30 (FIG. 5), the pin moves rapidly upwardly to force the heel 13 away from the heel cleat 6. Upon reaching the upper limit of its travel, the pin 30 stops while the heel 13 continues movement in a direction away from the pin (FIG. 6).

In the apparatus of FIGS. 4 to 7, the pin 30 is in the form of a cylinder 35 closed at the top end and provided with upwardly extending fingers 36, equal in number to the number of prongs 37 on the heel cleat 6. Heel cleats 6 are preferably formed integral with the mold bottom 5, and are initially heel-shaped. It is preferable to produce prongs 37 of the heel cleat 6 and the fingers 36 of the ejector pin 30 simultaneously. This is done by drilling a hole 38 through the mold bottom in the heel portion where the junction of the ribs 19 and 20 will ultimately be found. A rod having a cavity in its bottom end is inserted into the hole 38, locked therein, and the heel cleat prongs 37 and fingers 36 are machined simultaneously. Thus, the fingers 36 are slidably mounted in the cleat 6 and form part of the prongs 37.

The ejector pin 30 is slidably mounted in the hole 38 by providing internal threads 40 at the bottom end of the pin for receiving a sleeve 41 which slidably mounts the pin on a post 42 having a hexagonal cross-sectional configuration for preventing rotation of the sleeve 41 and pin 30. A stop element in the form of a disc 43 is provided on the top end of the post 42 with a helical spring 44 disposed between the top end of the sleeve 41 and the disc 43.

The sleeve 41 also includes an annular groove 46 for receiving an O-ring 47 of circular cross-sectional configuration. The O-ring 47 is loose, but not slack in the groove 46. Radial holes 50 extend through the wall of the sleeve at the lower inner corner of the groove 46. A nut 52 is provided on the lower end of the post for retaining the post 42 in the hole 30, which has an internally threaded bottom end for receiving the nut 52.

In operation, following injection and curing of the sole 1, air under pressure is introduced into the chamber 34 through a duct 53 to move the pin rapidly upwardly to eject the heel 13. of source, when the sole includes a front portion, the latter is simultaneously ejected by pins 15 in the mold bottom beneath such front end. Air entering the chamber 34 passes between the sleeve 41 and the post 42, and is discharged through the radial holes 50 against the O-ring 47 forcing the latter outwardly and upwardly against the wall of the hole 38 and the top of the groove 46. Thus, the space between the bottom of the ejector pin 30 and the wall of the hole 38 is effectively sealed, whereby rapid upward movement of the pin is facilitated. At the top of the pin stroke, the spring 44 is compressed between the disc 43 and the sleeve 41. Thus, the spring 44 acts as a brake for the ejector pin 30. Following release of the heel 13, the duct 53 is connected to a vacuum source (not shown) whereby air is rapidly removed from the chamber 34 and the ejector pin 30 is returned to its initial position. At such time, air is evacuated from the groove 46 and the O-ring 47 relaxes to its initial position permitting rapid return of the pin 30.

Figure 4:
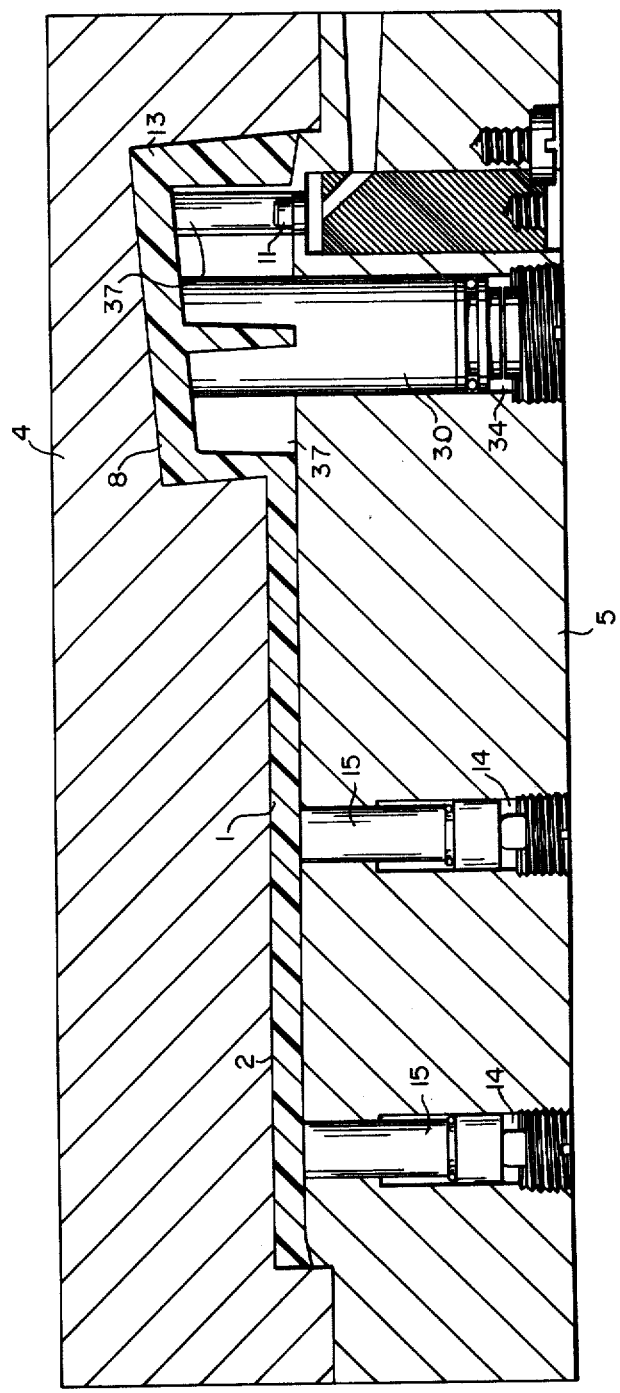
FIG. 4 is a longitudinal sectional view of a mold for molding the shoe sole of FIG. 3.
Figure 7:
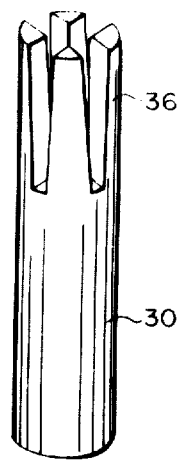
FIG. 7 is a perspective view of the ejector pin used in the apparatus of FIGS. 4 to 6.
Figure 8:
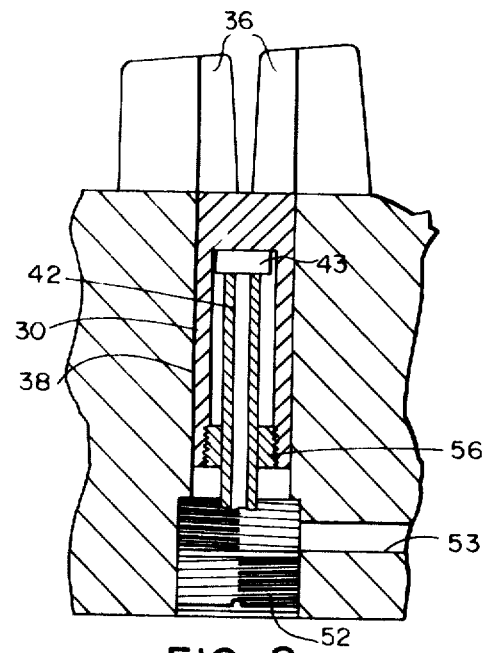
FIGS. 8 and 9 are longitudinal sectional views of the heel end of a bottom mold incorporating another embodiment of the heel ejector device during molding and ejecting operations, respectively.
Figure 9:
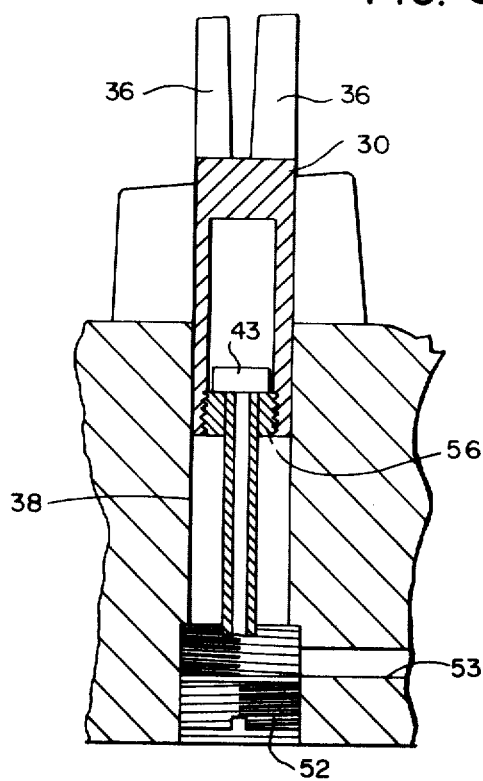

Referring now to FIGS. 8 and 9, where a somewhat simpler ejector device is shown, a cylindrical ejector pin 30 having fingers 36 at its top end is slidably mounted in a hole 38. The hole 38 is internally threaded at its bottom end for receiving a nut 52 on the bottom end of a hexagonal guide post 42. The post may also be square or have any other polygonal cross-sectional configuration which will prevent rotation of the ejector pin 30. If the pin 30 was permitted to rotate, the fingers 36 would not be properly aligned with the prongs 37 of the heel cleat 6. The difference between this embodiment of the invention and that of FIGS. 4, 5 and 6 is that the sleeve 41 is replaced by a nut 56.

Another embodiment of the invention is illustrated in FIGS. 10 to 12. In the embodiment of FIGS. 10 to 12, which is virtually identical to that of FIGS. 8 and 9, the ejector pin 30 is replaced with an ejector pin 60, which has a cylindrical lower portion of larger diameter than the remainder of the pin. Thus, a relatively small surface area of the ejector pin 60 is in contact with the wall of the hole 38 in the bottom mold 5. A ring 62, e.g., an O-ring is provided on the pin on top of the lower portion. The ring 62 cushions the impact of the ejector pin against the top wall of the hole 38.

Figures 13, 14:
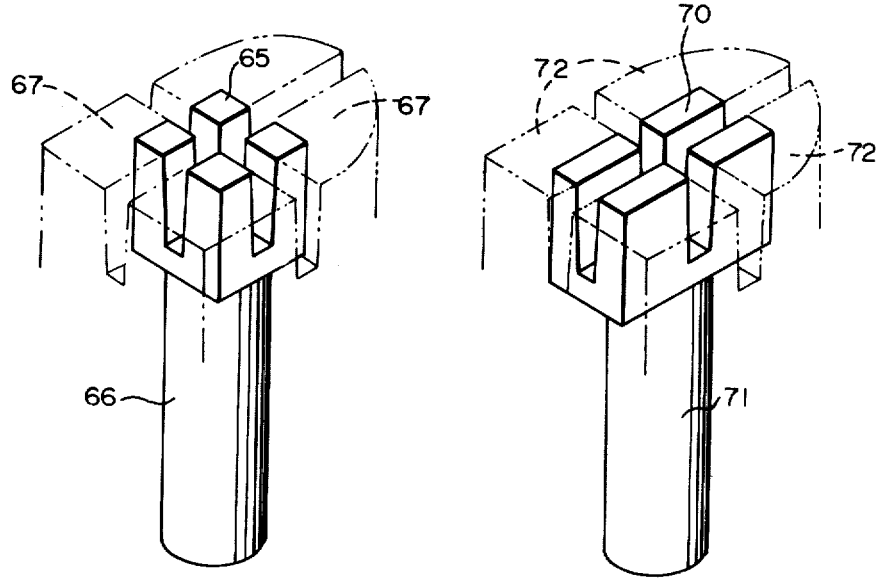
FIGS. 13 to 15 are perspective views of other forms of ejector pins for use in the device of the present invention, with heel cleats shown in phantom outline.
Figure 15:
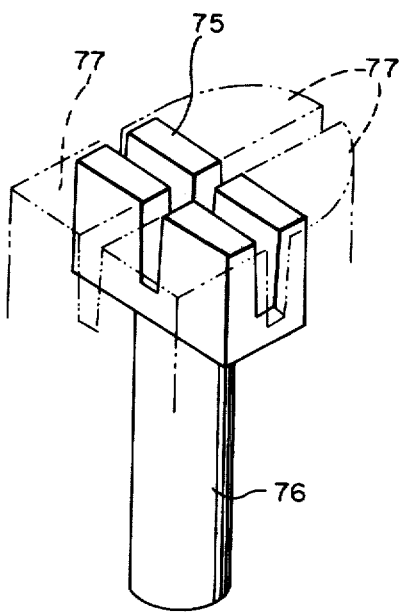

FIGS. 13 to 15 show three additional variations of the ejector pin. The fingers 65 of the ejector pin 66 of FIG. 13 have a square cross-sectional configuration, and form the inner corners of the prongs 67 of a heel cleat. The fingers 70 of the ejector pin 71 of FIG. 14 are rectangular in cross-sectional configuration, the longer sides of the rectangle extending in the longitudinal direction of the prongs 72 of a heel cleat. Finally, the fingers 75 of the ejector pin 76 of FIG. 15 are also rectangular in crosssectional configuration, but extend in a direction perpendicular to the longitudinal axes of the heel cleats 77.

It will be appreciated from the foregoing that the shape of the fingers of the ejector pin used in the device of the present invention can be varied, according to the requirements of the molding apparatus. For example, it is possible to have more than one longitudinally or transversely extending rib in the finished heel, and thus it would be necessary to provide at least one ejector pin shaped to conform to the inner edges of the prongs of the heel cleat. Of course, more than one ejector pin could be used.

I claim:

1. An ejector device for use in an injection molding apparatus, in which a sole is molded in a mold cavity defined by a mold top, a mold bottom and a heel cleat on said mold bottom extending into a heel cavity in the mold top, the heel cleat including a plurality of prongs, said ejector device comprising an ejector pin including a plurality of fingers equal in number to the number of prongs on said cleat, each of said fingers being slidably mounted in and forming a part of one of said prongs, pressure means for thrusting said ejector pin against the interior of the heel to eject the heel from the bottom mold a guide post fixedly mounted in a hole in said bottom mold, means slidably mounting said ejector pin on said guide post, said pressure means including a duct for introducing air under pressure beneath said ejector pin in said bottom mold to force said ejector pin out of said bottom mold, and means for returning the ejector pin to a rest position.

2. A device according to claim 1, wherein said means for returning the ejector pin to a rest position comprises means for applying a vacuum beneath said ejector pin.

3. A device according to claim 1, wherein said ejector pin is a hollow cylinder closed at one end by said fingers, said means for slidably mounting said ejector pin on said post is a sleeve means, stop means on said post for limiting movement of said sleeve means and cylinder on said post.

4. A device according to claim 3, including spring means between said sleeve means and said stop means for braking said ejector pin during movement out of said bottom mold.

5. A device according to claim 3, wherein said hollow cylinder includes a portion of larger diameter of the remainder of the cylinder, whereby there is relatively little contact between said ejector pin and the wall of said hole.

6. A device according to claim 3, including a groove extending around said sleeve means, an O-ring loosely mounted in said groove for freely sliding in said hole in the bottom mold with said sleeve means, and radial holes in said sleeve means extending into said groove for introducing air under pressure into said groove for sealing a space between said sleeve and the hole in the bottom mold to facilitate rapid movement of the ejector pin out of said bottom mold, and for applying a vacuum to said groove to relax the O-ring into the groove for return of the ejector pin to the rest position.

* * * * *